Patented Feb. 12, 1935

1,990,769

UNITED STATES PATENT OFFICE 1,990,769

AMINO ACIDS

Harold M. Barnett, Cleveland, Ohio, assignor to S. M. A. Corporation, Cleveland, Ohio, a corporation of Ohio No Drawing. Application January 16, 1930, Serial No. 421,311

1 Claim. (Cl. 260—119)

This invention relates to the preparation of amino acids, such as gultamic acid or the like. Such acids are generally produced from various proteins, which primarily are composed of groups of amino acids linked together in various combinations and proportions.

The object of the present invention is to provide a method of isolating any desirable amino acid in relatively pure form without contamination by salts or hydrochlorides, and in a manner to reduce cost by reduction in the amount of acid necessary, as well as by a reduction in the amount of neutralizing base and avoiding any necessity for use of other precipitating materials.

Further objects of the invention are in part obvious and in part will appear more in detail hereinafter.

In the formation of amino acids from proteins, the protein is usually broken down by hydrolysis with acids, alkalis or enzymes. Acids are more commonly employed, the usual method in the formation of glutamic acid being to hydrolyze with an acid, such as hydrochloric acid, neutralize and then precipitate a salt, such as the barium, calcium or sodium salt, by the use of alcohol or like material. The glutamate thus precipitated usually contains sodium chloride or other salt and is not the free acid, and its formation requires unnecessary excess of both acid and base.

Nearly all of these amino acids contain one or more amino (NH₂) groups with basic properties and one or more carboxyl (COOH) groups with acid properties. They are therefore amphoteric, —that is, capable of reacting as an acid toward a base, and as a base toward an acid, and with each of them there is usually a more or less well defined point, with respect to the hydrogen ion concentration of a solution thereof, at which the dissociation of positive or negative ions is equal, known as the isoelectric point. Both dissociation and solubility of the substance are lowest at the isoelectric point. Moreover, since the various amino acids contain different numbers of both acid and alkaline groups and also differ otherwise in composition and structure, it is usually true that they differ more or less widely in their isoelectric points. Sometimes the isoelectric point is more or less sharply defined, and in other cases the isoelectric point may to all intents and purposes have some range and may even overlap the isoelectric point of another acid. However, in some cases use of this isoelectric point permits of quite complete separation of one amino acid from another when the isoelectric points of the several amino acids present do not conflict, as will more fully appear.

While the method herein described is applicable to various amino acids made from different kinds of proteins, for convenience the description hereinafter will be more or less directed to one specific acid, to wit, glutamic acid, the isoelectric point of which may be expressed as approximately pH3.2, which is on the acid side of neutrality. Glutamic acid is referred to because its sodium salt is of industrial importance as a condiment or as an ingredient of sauces, since it has a quite characteristic meat flavor and is used for that reason.

Glutamic acid is the predominant amino acid in wheat gluten, from which it is usually prepared, because its yield from that protein is larger than from other sources, although it may also be obtained from other products. The raw material, such as wheat gluten, is first hydrolyzed by heating it with a suitable mineral acid, such as hydrochloric acid. In practice 20% hydrochloric acid is used in the proportion of three parts by weight to one of the wheat gluten. The hydrolysis is continued over a period of about twenty-four hours. All of the factors in this step of hydrolysis may be varied to suit conditions, such as, for example, the use of some other acid like sulfuric, the time of hydrolysis, the temperature, strength of acid, ratio of acid to protein, the use of catalysts, etc. Hydrolysis under pressure tends to reduce the time of treatment.

During hydrolysis more or less dark brown humin and possibly other objectionable organic compounds may be formed. Such materials are preferably immediately removed from the hydrolysate by the addition of decolorizing carbon, boiling for a short time, filtering and cooling. The humin and other organic compounds are removed at this stage of the process because, as will later appear, neutralization is a later step and is carried out to a more or less exact point by determination of the pH of the solution from time to time. Colorometric determinations of the pH are practically impossible unless the humin is removed, because it so masks and obscures the true color, whereas when pH determinations are by other methods, such as by the use of the quinhydrone electrode, the presence of humin is found to make all determinations quite erratic and unreliable.

The resultant filtrate is now concentrated in any suitable manner. Preferably, concentration is carried out in a manner to remove as much of the free hydrochloric acid as possible without liability of change or decomposition of the material being treated. Concentration may be performed by an ordinary evaporating step under normal atmospheric pressure, but reduced pressure is desirable if decomposition is to be minimized, and the main purpose of the step is to remove as much free acid as possible. During concentration a considerable amount of material, mostly glutamic acid hydrochloride in this instance, crystallizes out. The residue, containing the crystals, is taken up with warm water until the volume in liters is approximately twice the number of kilograms of the original protein treated.

Having properly diluted the solution, as stated, it is now neutralized by the use of a suitable base, either hydroxide, such as sodium hydroxide, or a carbonate, such as sodium carbonate, although hydroxides or carbonates of any alkali metal or alkaline earth metal may be employed. The neutralizing step is of prime importance because by it separation of a given amino acid from others as well as substantially complete precipitation are both secured. The neutralization is therefore carried out carefully by suitable tests from time to time, with a gradual addition of the neutralizing agent until the solution is neutralized to a point where its hydrogen ion concentration corresponds as closely as possible to the isoelectric point of the particular amino acid to be isolated, which, in the case of glutamic acid, in this instance, would correspond to about pH 3.2. At this point a large amount of the particular amino acid, such as glutamic acid, precipitates as the acid. Of course, it will be understood that maximum benefits of the invention are realized when the isoelectric point is sharply defined and to the degree that neutralization coincides with the isoelectric point, and that the yield decreases more or less acccording to the departure in one direction or the other of the hydrogen ion concentration of the solution from the required isoelectric point. The invention contemplates some latitude in this respect so long as the benefits of the invention are secured.

To insure more complete isolation, the mixture may be permitted to stand in a cool place for some time, such as over night. It is then filtered and washed several times with cold water, and if a purer product is desired it may be obtained by re-crystallizing.

In the description to this point it should be noted that reference has been made only to hydrolysis with an acid and neutralizing with a base. However, it is immaterial whether neutralization is reached from the base side or from the acid side of neutrality. In other words, with certain amino acids the best effects may be secured by hydrolyzing with a base and neutralizing with an acid, and such reasonable variations are within the scope of the present invention.

The step of crystallization by careful neutralization to the proper isoelectric point may be more or less characterized as fractional crystallization, because by this method it is possible to separate from the same mother liquor, first one and then another of the several amino acids present.

Having obtained the amino acid, such as glutamic acid, any desired salts thereof may be formed by the addition of suitable bases in proper amounts, followed by crystallization, by spray drying, or any other suitable collecting step.

The present method has the advantage of utilizing minimum quantities of both acid and base for the preparation of the amino acids, and dispensing with the use of alcohol or other precipitating agent. Moreover, the material is obtained as the free acid, dispensing with an extra step of preparing the acid from one of the salts, as has usually been the case in prior practice.

The method also saves several filtration steps usually employed for the reason that by the present method the material is decolorized immediately after hydrolysis instead of at a later stage. Also, a large amount of hydrochloric or other acid employed may be recovered for further use.

What I claim is:

The method of producing a plurality of amino acids from proteins and separating them from each other which comprises hydrolyzing a protein capable of yielding a plurality of amino acids having different isoelectric points, adjusting the hydrogen ion concentration of the solution to correspond to the isoelectric point of one of the amino acids, thereby causing the formation of a precipitate consisting chiefly of such amino acid, removing such precipitate from the mother liquor, further adjusting the hydrogen ion concentration of the mother liquor to correspond to the isoelectric point of another amino acid in the mixture, thereby causing the precipitation of this amino acid, and removing the precipitate.

HAROLD M. BARNETT.